United States Patent
Seibert

(10) Patent No.: US 11,168,734 B2
(45) Date of Patent: Nov. 9, 2021

(54) DUST BOOT FOR A TIE ROD END OF A SICKLE BAR OF A COMBINE AND A METHOD OF MAKING

(71) Applicant: Federal-Mogul Motorparts LLC, Southfield, MI (US)

(72) Inventor: Trevor G. Seibert, Millstadt, IL (US)

(73) Assignee: Federal-Mogul Motorparts LLC, Southfield, MI (US)

(*) Notice: Subject to any disclaimer, the term of this patent is extended or adjusted under 35 U.S.C. 154(b) by 0 days.

(21) Appl. No.: 16/773,758

(22) Filed: Jan. 27, 2020

(65) Prior Publication Data
US 2020/0154633 A1 May 21, 2020

Related U.S. Application Data

(63) Continuation of application No. 15/629,844, filed on Jun. 22, 2017, now Pat. No. 10,542,668.

(51) Int. Cl.
*F16C 11/06* (2006.01)
*A01D 34/14* (2006.01)
*F16J 3/04* (2006.01)

(52) U.S. Cl.
CPC ........ *F16C 11/0671* (2013.01); *A01D 34/145* (2013.01); *F16C 11/0695* (2013.01); *F16J 3/042* (2013.01); *F16C 11/0633* (2013.01); *F16C 11/0642* (2013.01); *F16C 2208/66* (2013.01); *F16C 2220/06* (2013.01); *F16C 2310/00* (2013.01); *Y10T 403/315* (2015.01); *Y10T 403/32729* (2015.01)

(58) Field of Classification Search
CPC .............. A01D 34/145; F16C 11/0633; F16C 11/0666; F16C 11/0671; F16C 11/0676; F16C 11/0685; F16C 11/0695; F16D 3/848; F16J 3/04; F16J 3/042; F16J 3/048; F16J 15/52; Y10T 403/31; Y10T 403/315; Y10T 403/32729; Y10T 403/32737
USPC ............ 464/173–175; 403/50, 51, 134, 135; 277/634–636; 74/18, 18.1
See application file for complete search history.

(56) References Cited

U.S. PATENT DOCUMENTS 3,343,855 A * 9/1967 Husen ................. F16C 11/0671
403/51
3,381,987 A * 5/1968 Husen ................. F16C 11/0671
403/51

(Continued)

FOREIGN PATENT DOCUMENTS

DE 19850378 C1 * 3/2000 .......... F16C 11/0671
DE 102008043248 A1 * 5/2010 .......... F16C 11/0671

*Primary Examiner* — Josh Skroupa
(74) *Attorney, Agent, or Firm* — Robert L. Stearns; Dickinson Wright, PLLC

(57) ABSTRACT

The tie rod end includes a housing with an inner bore that extends along a central axis. A stud is partially received in the inner bore and has a shank portion which extends out of the inner bore for attachment with a gearbox. The tie rod end further includes an elastic boot body which extends from a first boot end, which is sealed with the housing, to a second boot end. A boot bearing, which is made of a plastic material, is secured with the second boot end. The boot bearing is in a dynamic sealing engagement with the shank portion of the stud. The boot bearing presents a plurality of radially inwardly extending and annularly-shaped ribs that contact the shank portion.

16 Claims, 5 Drawing Sheets

(56) References Cited

U.S. PATENT DOCUMENTS

| | | | | |
|---|---|---|---|---|
| 4,758,110 A | * | 7/1988 | Ito | F16C 11/0638 403/122 |
| 6,089,574 A | * | 7/2000 | Sadr | F16D 3/845 277/635 |
| 6,814,521 B2 | * | 11/2004 | Suzuki | F16C 11/0671 403/134 |
| 6,913,409 B2 | * | 7/2005 | Abels | F16C 11/0671 403/134 |
| 7,441,979 B2 | * | 10/2008 | Heidemann | F16C 11/0671 403/134 |
| 9,357,696 B2 | * | 6/2016 | Ritter | A01D 34/145 |
| 9,765,893 B2 | * | 9/2017 | Hosen | F16C 11/0671 |
| 9,863,464 B2 | * | 1/2018 | Hosen | F16C 11/0671 |
| 2003/0156894 A1 | * | 8/2003 | Suzuki | F16C 11/0671 403/134 |
| 2004/0028302 A1 | * | 2/2004 | Abels | F16C 11/0671 384/206 |
| 2009/0194953 A1 | * | 8/2009 | Sueoka | F16D 3/845 277/636 |
| 2010/0260538 A1 | * | 10/2010 | Brunneke | F16C 11/0671 403/134 |

\* cited by examiner

DUST BOOT FOR A TIE ROD END OF A SICKLE BAR OF A COMBINE AND A METHOD OF MAKING

CROSS-REFERENCE TO RELATED APPLICATION

This application claims priority to U.S. patent application Ser. No. 15/629,844, filed Jun. 22, 2017 and titled "DUST BOOT FOR A TIE ROD OF A SICKLE BAR OF A COMBINE AND A METHOD OF MAKING," the entire contents of which is herein incorporated by reference.

BACKGROUND OF THE INVENTION

1. Field of the Invention

The present invention is related, generally, to sickle bar assemblies (also known as knife blade assemblies) for combines and more particularly to an improved boot for a tie rod end of a sickle bar assembly.

2. Related Art

In use, a sickle bar of a combine harvester oscillates back and forth at an extremely high frequency to cut grain, grasses or other plants as the harvester travels through a field. The sickle bar is powered by a gearbox (also known as a "wobble box") which is operatively connected to a ball stud which is received within a housing of a tie rod end. During operation, the ball stud is rotated and articulated at a high frequency relative to the housing, which drives the oscillating motion of the sickle bar.

Such tie rod ends also typically include a dust boot which is sealed against the housing and the ball stud to keep a lubricant within and keep lubricants out of an inner bore of the housing. In some cases, after many operating cycles, the dust boot can tear due to stresses from the rotational movement of the ball stud relative to the housing. Such tears may require replacement of the entire tie rod end. In addition to maintenance costs, this may result in downtime for the combine harvester, which can cost a farmer income. Therefore, there is a continuing desire for an improved tie rod end that has an increased operating life.

SUMMARY OF THE INVENTION

One aspect of the present invention is related to a tie rod end for a sickle bar of a combine. The tie rod end includes a housing with an inner bore that extends along a central axis. A stud is partially received in the inner bore and has a shank portion which extends out of the inner bore for attachment with a gearbox. The tie rod end further includes an elastic boot body which extends from a first boot end, which is sealed with the housing, to a second boot end. A boot bearing, which is made of a plastic material, is secured with the second boot end. The boot bearing is in a dynamic sealing engagement with the shank portion of the stud. The boot bearing presents a plurality of radially inwardly extending and annularly-shaped ribs that contact the shank portion.

The dynamic sealing engagement between the plastic material of the boot bearing and the shank portion of the stud allows the gearbox to operate at a very high frequency while imparting minimal stresses into the elastic boot body, thereby improving the durability and operating life of the tie rod end. The grooves between the ribs reduce the surface-to-surface contact area between the boot bearing and the shank portion of the stud, thereby reducing the friction between the boot bearing and the shank portion and further improving the operating life of the tie rod end.

According to another aspect of the present invention, the boot bearing further includes a first flange portion which presents a plurality of axially extending and annularly-shaped second ribs that are spaced radially from one another by a plurality of second grooves for reducing a surface-to-surface contact area between said boot bearing and a block of the gearbox.

According to yet another aspect of the present invention, the shank portion of the stud presents a cylindrical portion with a generally constant diameter and wherein the first ribs of the boot bearing are in contact with the cylindrical portion.

According to still another aspect of the present invention, the boot bearing is in an overmolding engagement with the elastic boot body.

According to a further aspect of the present invention, the second end portion of the elastic boot body is received within a channel of the boot bearing.

According to yet a further aspect of the present invention, the plastic material of the boot bearing is polyoxymethylene.

Another aspect of the present invention is related to a sickle bar assembly for a combine. The assembly includes a sickle bar and a gearbox that includes a block. A tie rod interconnects the sickle bar with the block of the gearbox for transferring motion from the gearbox to the sickle bar. The tie rod end includes a housing with an inner bore that extends along a central axis. A stud is partially received in the inner bore and has a shank portion which extends out of the inner bore and is fixedly attached with the block of the gearbox. The assembly further includes an elastic boot body which extends from a first boot end that is sealed against the housing, to a second boot end. A boot bearing that is made of a plastic material is secured to the second boot end and is in a dynamic sealing engagement with the shank portion of the stud. The boot bearing presents a plurality of radially inwardly extending and annularly shaped first ribs that contact the shank portion of the stud and that are spaced from one another in an axial direction by a plurality of first grooves for reducing a surface-to-surface contact area between the bearing and the shank portion of the stud.

According to another aspect of the present invention, a dynamic seal is also established between the boot bearing and the block of the gearbox.

According to yet another aspect of the present invention, the boot bearing further includes a plurality of axially extending and annularly shaped second ribs that contact the block of the gearbox and that are spaced from one another by a plurality of second grooves.

According to still another aspect of the present invention, the elastic boot body further includes an axially extending lip which is in a dynamic sealing engagement with the block of the gearbox.

Yet another aspect of the present invention is related to a method of making a sickle bar assembly. The method includes the step of inserting a portion of a stud into an open bore of a housing such that the stud extends along a central axis out of the inner bore through an open end of the housing. The method continues with the step of preparing an elastic boot body that extends from a first boot end to a second boot end. The method proceeds with the step of fixedly attaching a boot bearing, which is made of a more rigid material than the elastic boot body, with the second boot end of the elastic body. The boot bearing has a plurality of radially inwardly extending and annularly shaped first ribs that are separated from one another by at least one first groove. The method continues with the step of establishing a static seal between the first boot end of the elastic boot body and the housing. The method proceeds with the step of establishing a dynamic seal between the first ribs of the boot bearing and the stud. The method continues with the step of fixedly attaching the housing with a sickle bar. The method continues with the step of fixedly attaching the stud with a gearbox.

According to yet another aspect of the present invention, the boot bearing further includes a plurality of axially extending and annularly shaped second ribs that are spaced radially from one another by at least one second groove.

BRIEF DESCRIPTION OF THE DRAWINGS

These and other features and advantages of the present invention will be readily appreciated, as the same becomes better understood by reference to the following detailed description when considered in connection with the accompanying drawings wherein.

DESCRIPTION OF THE ENABLING EMBODIMENT

Figure 1:
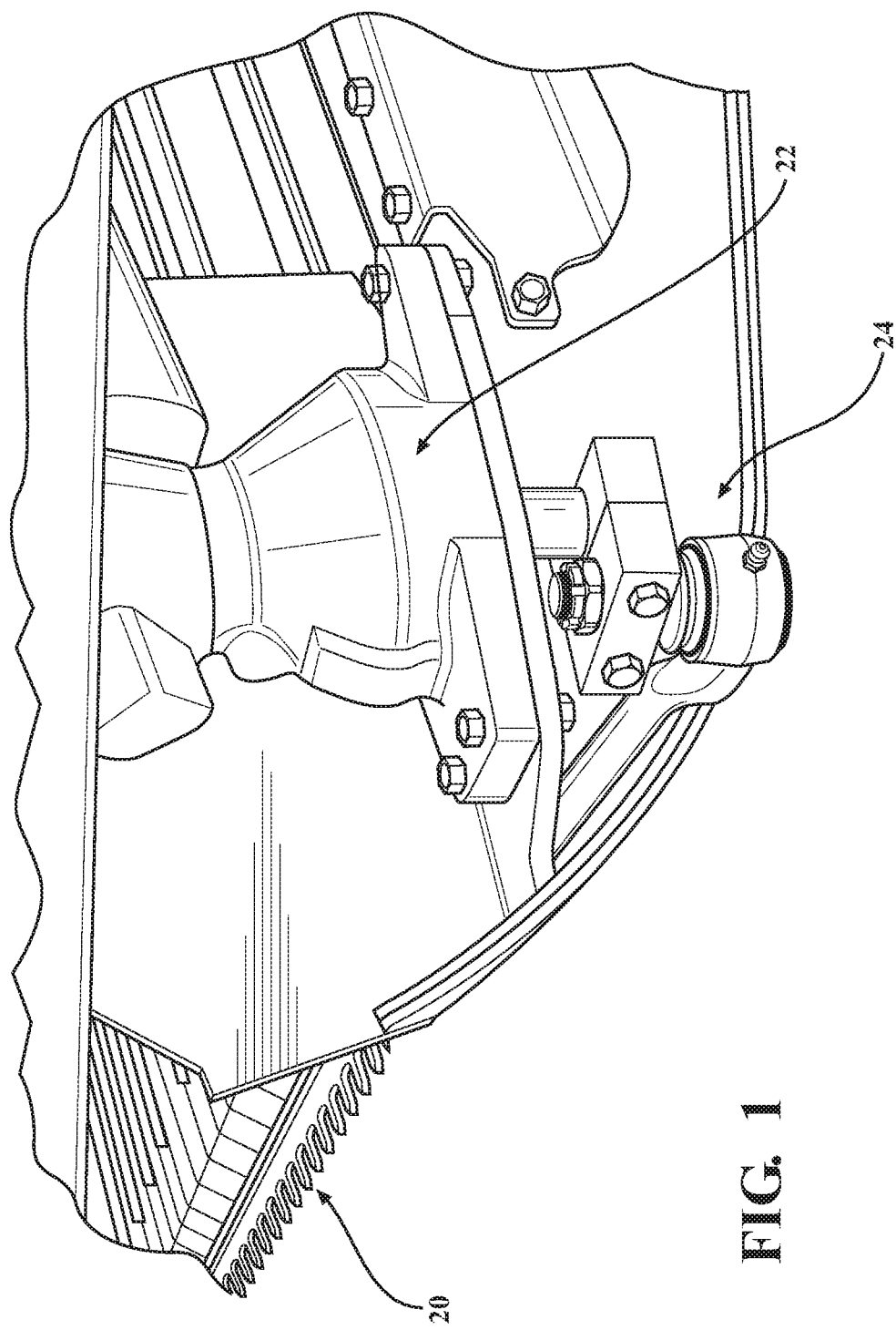
FIG. 1 is a perspective elevation view showing a tie rod end which is interconnecting a sickle bar with a gearbox of a combine.
Figure 2:
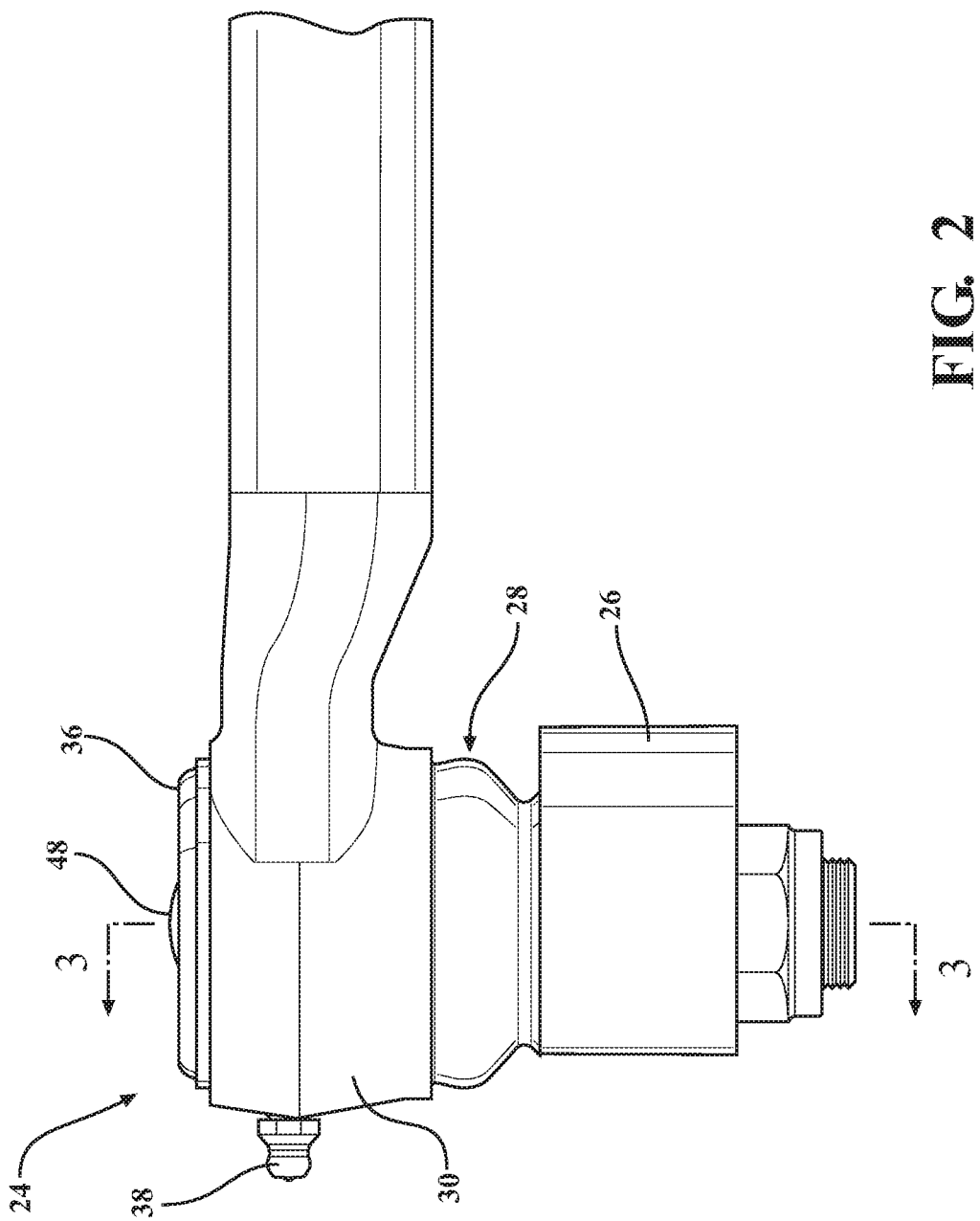
FIG. 2 is a perspective elevation view of the tie rod end of FIG. 1.
Figure 3:
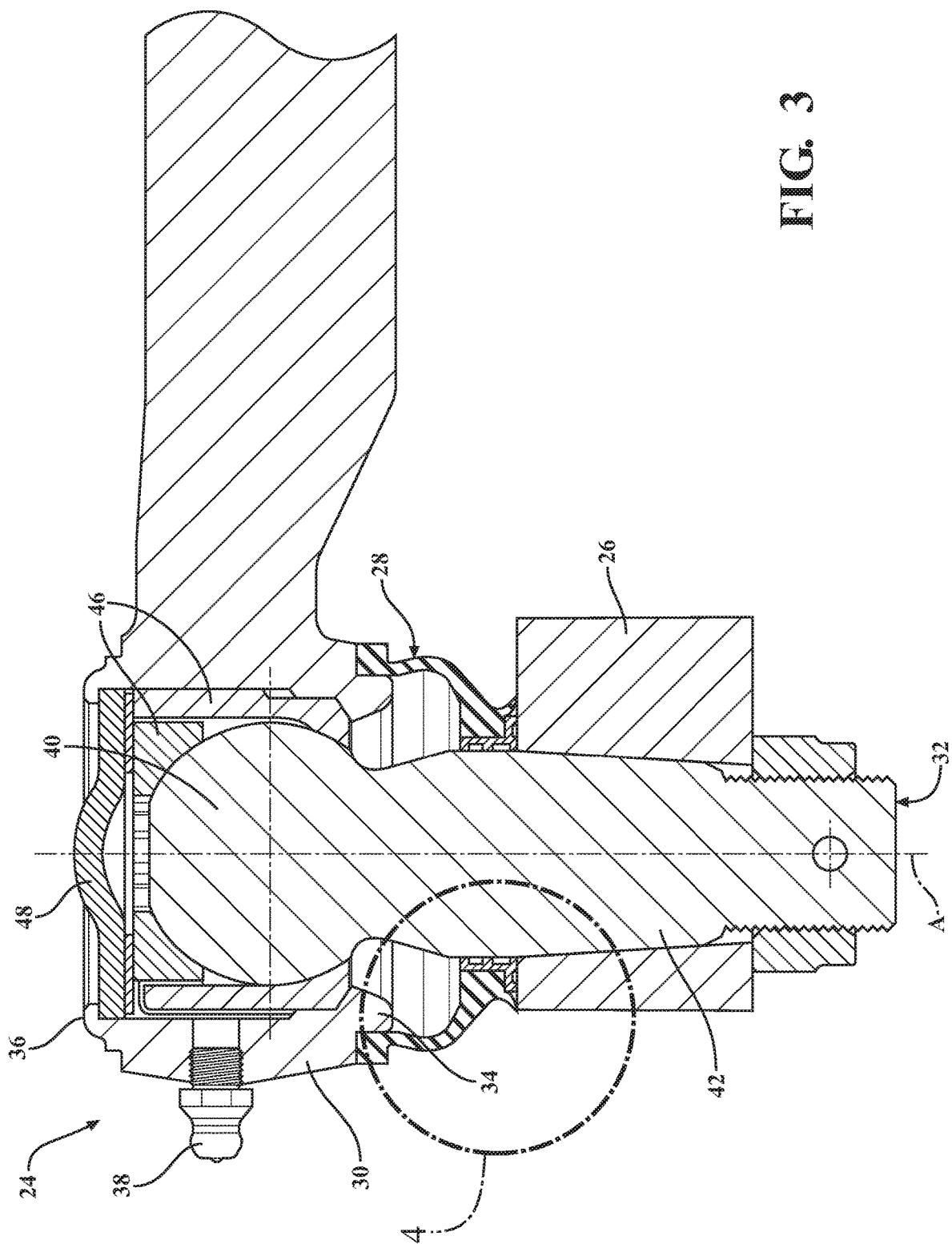
FIG. 3 is a cross-sectional view of the tie rod end of FIG. 1 attached with the gearbox of the combine.
Figure 4:
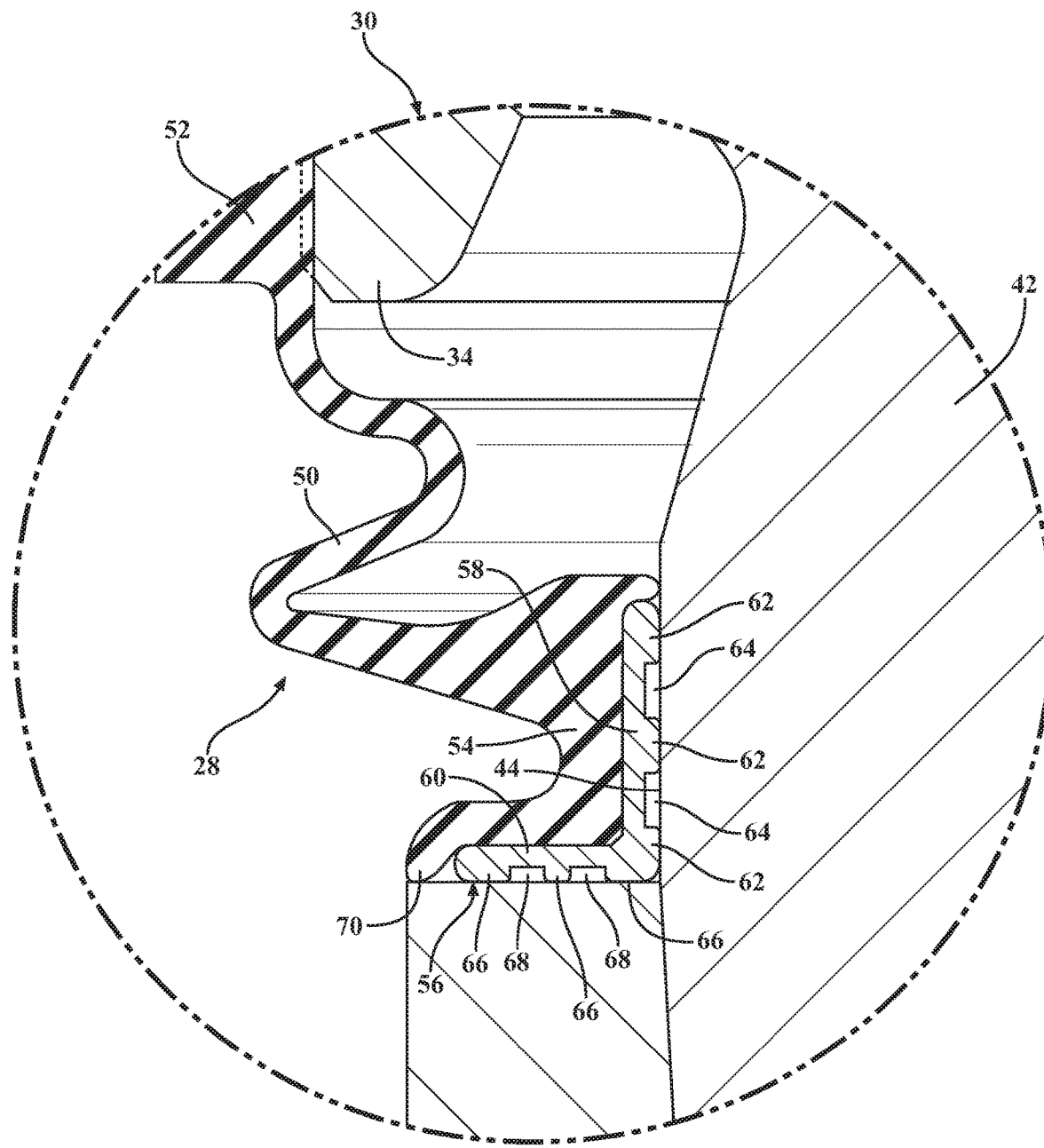
FIG. 4 is an enlarged view of a portion of FIG. 3 and focused on a portion of a boot of the tie rod end.

Referring to the Figures, wherein like numerals indicate corresponding parts throughout the several views, a combine with a sickle bar 20 that is attached with a gearbox 22 via a first exemplary embodiment of a tie rod end 24 is generally shown in FIG. 1. In operation, the tie rod end 24 transfers motion from a block 26 (shown in FIGS. 3 and 4) in the gearbox 22 to a blade on the sickle bar 20 to oscillate the blade back and forth at a very high frequency for cutting grain, grass, crops, or any suitable plant. As shown in FIGS. 2-4, the tie rod end 24 includes a ball joint with an improved dust boot 28 which has an improved durability and operating life for sealing a housing 30 with a ball stud 32 of a tie rod end 24.

The exemplary embodiment of the tie rod end 24 includes a housing 30 that has an inner wall that defines an inner bore which extends along a central axis A from a first open end 34 to a second open end 36. The first open end 34 has a radially inwardly extending flange which serves as a stop surface for inserting certain components into the inner bore. The housing 30 also has a lubricant opening formed into a side wall thereof and a zerk fitting 38 for conveying a lubricant into the inner bore through the lubricant opening during initial greasing of the tie rod end 24 and during routine maintenance. The housing 30 is preferably made as a single monolithic piece of metal, such as steel or alloy steel, and may be shaped through any suitable process or processes (such as casting, forging, machining, etc.).

As shown in FIG. 3, the ball stud 32 has a ball portion 40 and a shank portion 42 which are integrally connected with one another. The ball portion 40 is disposed in the inner bore of the housing 30 and has a semi-spherically shaped outer surface. The shank portion 42 extends from the ball portion 40 to a threaded distal end that projects out of the inner bore through the first open end 34. The shank portion 42 presents a cylindrical area 44 that is located between two tapered areas and is spaced between the ball portion 40 and the threaded end. The cylindrical area 44 has a generally constant diameter for a predetermined length. The ball stud 32 is preferably made as a single, monolithic piece of metal, such as steel or an alloy steel and may be shaped through any suitable process or processes.

In the exemplary embodiment, a pair of ball stud bearings 46 are disposed in the inner bore between the ball portion 40 of the ball stud 32 and the inner wall of the housing 30. The ball stud bearings 46 have semi-spherically curved bearing surfaces that are in slidable, surface-to-surface contact with the semi-spherical outer surface of the ball portion 40 for allowing the ball stud 32 and housing 30 to freely rotate and articulate relative to one another during operation of the sickle bar 20 assembly. The ball stud bearings 46 are preferably made of metal or plastic.

An end cap 48 is secured with the housing 30 at the second open end 36 to capture the ball portion 40 of the ball stud 32 and the ball stud bearings 46 in the inner bore of the housing 30. In the exemplary embodiment, the housing 30 is swaged to capture the end cap 48 in the inner bore of the housing 30. However, it should be appreciated that the end cap 48 could be fixed with the housing 30 through any suitable connection means including, e.g., threads or pressing the end cap 48 into a groove formed into the inner wall of the housing 30.

The dust boot 28 includes an elastic body 50 which extends along the central axis A from a first boot end 52, which is sealed against an outer surface of the housing 30, to a second boot end 54. The elastic body 50 is made as a single, monolithic piece of an elastically flexible material, such as Neoprene or any other natural or synthetic rubber, to allow the dust boot 28 to flex elastically as the housing 30 and ball stud 32 articulate relative to one another while maintaining the seals established with the housing 30 and ball stud 32.

As shown in FIG. 4, a boot bearing 56 is fixedly attached with the second boot end 54 of the elastic body 50 and is in surface-to-surface contact with the cylindrical area 44 of the shank portion 42 of the ball stud 32 to seal the dust boot 28 with the ball stud 32. As shown in FIG. 3, the boot bearing 56 is also in surface-to-surface contact with the block 26 of the gearbox 22 to seal the dust boot 28 with the block 26 of the gearbox 22. That is, the dust boot 28 is sealed against both the block 26 and the ball stud 32 to retain the lubricant within and to keep contaminants, such as water or dust, out of the inner bore of the housing 30.

The boot bearing 56 is preferably made as a single, monolithic piece of a low friction plastic that is substantially more rigid and less flexible than the elastic material of the boot body. The material of the boot bearing 56 is preferably polyoxymethylene (also known as POM, Delrin and acetal). The polyoxymethylene material provides a low friction interface between the dust boot 28 and the ball stud 32 such that a dynamic sealing engagement with the ball stud 32 is established. That is, as the ball stud 32 rotates at a high frequency relative to the housing 30 during operation of the sickle bar 20 assembly, the boot bearing 56 and boot body remain fixed with the housing 30. In the first exemplary embodiment, the boot bearing 56 is in an overmolding connection with the second boot end 54 of the boot body. The boot bearing 56 may also be provided with a grease relief passage (not shown) for allowing excess lubricant to be purged out of the housing 30 during routine maintenance.

The boot bearing 56 of the first exemplary embodiment is annular in shape and presents an axial portion 58 which extends along the central axis A and a flange portion 60 which extends radially outwardly from one axial end of the axial portion 58. The flange portion 60 is located on the opposite end of the axial portion 58 from the housing 30, and the end of the axial portion 58 facing the housing 30 is free of a flange portion 60. With reference to the orientation of the tie rod end 24 in FIGS. 3 and 4, the flange portion 60 is on the lower end of the boot bearing 56, and the upper end of the boot bearing 56 is free of a flange portion 60.

The axial portion 58 of the boot bearing 56 has a plurality of first ribs 62 which are annular in shape and which extend radially inwardly towards the central axis A to contact the cylindrical area 44 of the shank portion 42 of the ball stud 32. The first ribs 62 are spaced from one another in the axial direction by a plurality of first grooves 64 that are also annular in shape. The surface-to-surface contact between the first ribs 62 and the shank portion 42 of the ball stud 32 defines the dynamic seal between the dust boot 28 and the ball stud 32. In the first exemplary embodiment, the boot bearing 56 is provided with three of the first ribs 62 which are separated from one another by two first grooves 64. The presence of the first grooves 64 reduces the total surface-to-surface contact area between the boot bearing 56 and the shank portion 42 of the ball stud 32 to reduce friction between the dust boot 28 and the ball stud 32.

A lower surface of the flange portion 60 at the lower end of the boot bearing 56 is provided with a plurality of second ribs 66 which extend axially and which are annular in shape. The second ribs 66 are spaced from one another in the radial direction by a plurality of second grooves 68 that are also annular in shape. In the first embodiment, surface-to-surface between the second ribs 66 and the block 26 of the gearbox 22 defines the dynamic seal between the dust boot 28 and the block 26 of the gearbox 22. In the first exemplary embodiment, the boot bearing 56 is provided with three of the second ribs 66 which are spaced from one another by two of the second grooves 68. The presence of the second grooves 68 reduces the total surface-to-surface contact area between the boot bearing 56 and the block 26 to reduce friction between the dust boot 28 and the block 26.

The second not end 54 of the elastic body 50 of the dust boot 28 also presents an axially extending lip 70 which is in direct, surface-to-surface contact with the block 26 to establish a secondary seal between the dust boot 28 and the block 26. That is, the dust boot 28 is sealed against the block 26 via both the lip 70 and the second grooves 68 on the boot bearing 56. The lip 70 extends three hundred and sixty degrees (360°) around the central axis A.

Figure 5:
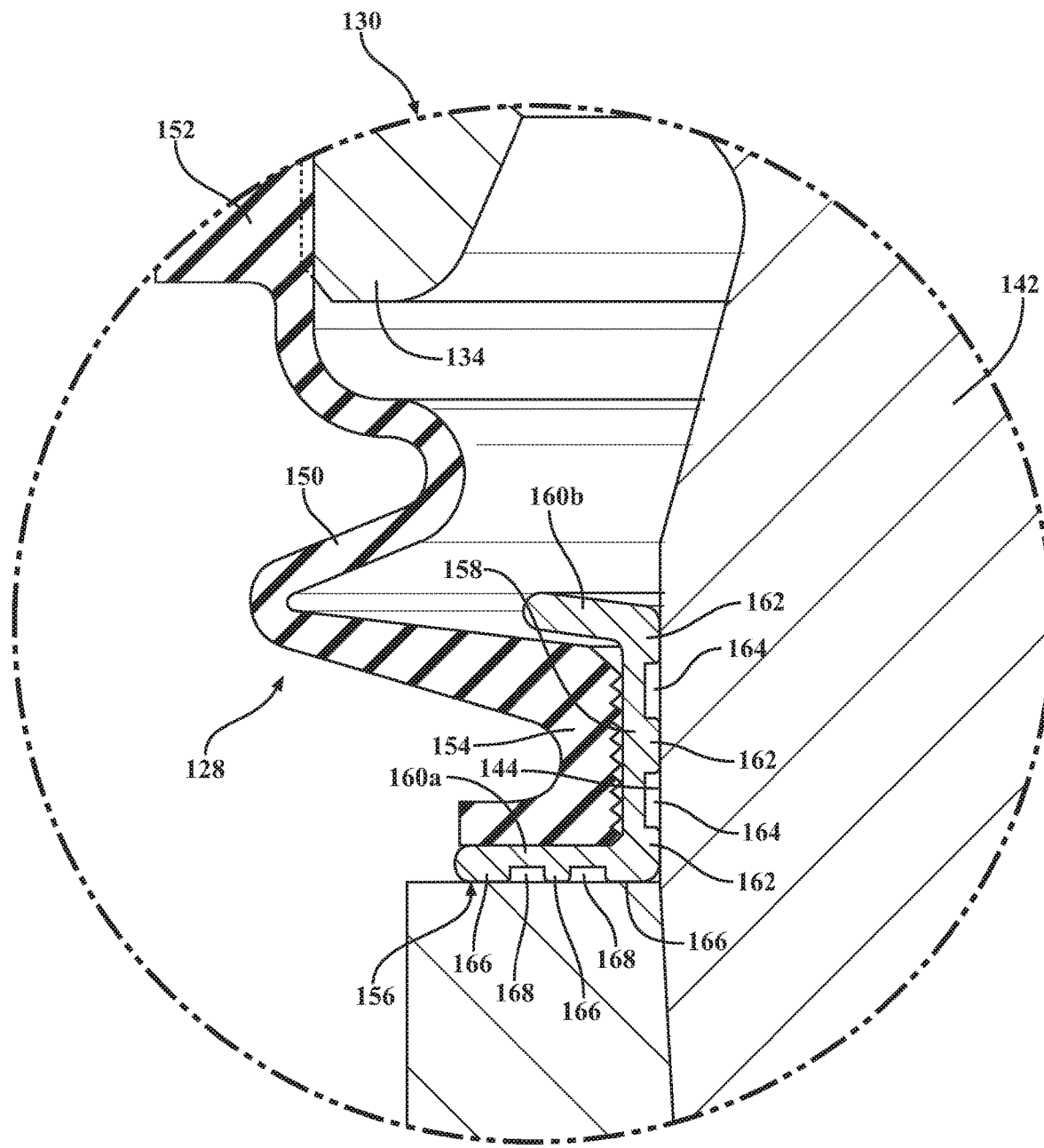
FIG. 5 is an enlarged view of a portion of an alternate embodiment of the tie rod end and focused on a portion of a boot of the tie rod end.

Referring now to FIG. 5, a second exemplary embodiment of the tie rod end 124 is generally shown with like numerals, separated by a prefix of "1", identifying corresponding parts with the first exemplary embodiment described above. In the second exemplary embodiment, the second boot end 154 of the elastic body 150 is installed onto the boot bearing 156 rather than overmolded onto the boot bearing 156 as is the case in the first exemplary embodiment. In this alternate embodiment, the boot bearing 156 includes flange portions 160a, 160b at both ends of the axial portion 158 to define a radially outwardly facing channel between the two flange portions 160a, 160b. The channel surrounds the central axis A, and the second boot end 154 of the elastic body 150 is inserted into the channel to fixedly attach the boot bearing 156 with the elastic body 150. The second boot end 154 is generally U-shaped in cross-section with a radially inwardly facing surface that contacts an outer surface of the axial portion 158 of the boot bearing 156, and the radially inwardly facing surface of the second boot end 154 is provided with a plurality of ridges to maintain a seal between the elastic body 150 and the boot bearing 156 of the dust boot 128. The upper flange portion 160b of the boot bearing 156 is angled axially towards the housing 130 to assist in the installation of the boot bearing 156 onto the second boot end 154 of the elastic body 150 by allowing the second boot end 154 to be more easily installed over the boot bearing 156.

Another aspect of the present invention is related to a method of making a sickle bar assembly, such as the sickle bar assembly of FIGS. 1-4. The method includes the step of inserting a portion of a ball stud 32 into an open bore of a housing 30 such that the ball stud 30 extends along a central axis A out of the inner bore through a first open end 34 of the housing 30. The method continues with the step of preparing an elastic body 50 that extends from a first boot end 52 to a second boot end 54. The method proceeds with the step of fixedly attaching a boot bearing 56, which is made of a more rigid material than the elastic body 50, with the second boot end 54 of the elastic body 50. The boot bearing 56 has a plurality of radially inwardly extending and annularly shaped first ribs 62 that are separated from one another by at least one first groove 64. The method continues with the step of establishing a static seal between the first boot end 52 of the elastic boot body and the housing 30. The method proceeds with the step of establishing a dynamic seal between the first ribs 62 of the boot bearing 56 and the stud. The method continues with the step of fixedly attaching the housing 30 with a sickle bar 20. The method continues with the step of fixedly attaching the ball stud 30 with a gearbox 22.

Obviously, many modifications and variations of the present invention are possible in light of the above teachings and may be practiced otherwise than as specifically described while within the scope of the appended claims. Additionally, it is to be understood that all features of all claims and all embodiments can be combined with each other, as long as they do not contradict each other.

What is claimed is:

1. A joint, comprising:
    a housing with an inner bore that extends along a central axis;
    a stud partially received in said inner bore and having a shank portion which extends out of said inner bore for attachment with a gearbox;
    an elastic boot body which extends from a first boot end that is sealed against said housing to a second boot end;
    a boot bearing made of a plastic material and secured to said second boot end and establishing a seal between said second boot end of said elastic boot body and said shank portion of said stud;
    said boot bearing presenting a plurality of radially inwardly extending and annularly shaped first ribs that contact said shank portion of said stud and that are spaced from one another in an axial direction by a plurality of first grooves for reducing surface-to-surface contact area between said bearing and said shank portion of said stud; and
    said elastic boot body further including an annular sealing lip on one axial side of said boot bearing, said sealing lip directly contacting said stud.

2. The joint as set forth in claim 1 wherein said boot bearing further includes a first flange portion which presents a plurality of axially extending and annularly shaped second ribs that are spaced radially from one another by a plurality of second grooves for reducing a surface-to-surface contact area between said bearing and another component.

3. The joint as set forth in claim 2 wherein said shank portion of said stud presents a cylindrical portion with a generally constant diameter and wherein said first ribs of said boot bearing are in contact with said cylindrical portion.

4. The joint as set forth in claim 1 wherein said boot bearing is in an overmolding engagement with said elastic boot body.

5. The joint as set forth in claim 1 wherein said second end portion of said elastic boot body is received within a channel of said boot bearing.

6. The joint as set forth in claim 1 wherein said plastic material of said boot bearing is polyoxymethylene.

7. A joint, comprising:
a housing with an inner bore that extends along a central axis;
a stud partially received in said inner bore and having a shank portion which extends out of said inner bore for attachment with a gearbox;
an elastic boot body which extends from a first boot end that is sealed against said housing to a second boot end;
a boot bearing made of a plastic material and secured to said second boot end and establishing a seal between said second boot end of said elastic boot body and said shank portion of said stud;
said boot bearing presenting a pair of flanges which are axially spaced apart from one another on opposite sides of a radially outwardly facing channel; and
said second end of said elastic boot body contacting said boot bearing in said radially outwardly facing channel and said second end presenting a plurality of spaced apart ridges for reducing surface-to-surface contact between said elastic boot body and said boot bearing.

8. The joint as set forth in claim 7 wherein said boot bearing further includes a first flange portion which presents a plurality of axially extending and annularly shaped second ribs that are spaced radially from one another by a plurality of second grooves for reducing a surface-to-surface contact area between said bearing and another component.

9. The joint as set forth in claim 8 wherein said shank portion of said stud presents a cylindrical portion with a generally constant diameter and wherein a plurality of first ribs of said boot bearing are in contact with said cylindrical portion.

10. The joint as set forth in claim 8 wherein said second end portion of said elastic boot body is received within the radially outwardly facing channel of said boot bearing.

11. The joint as set forth in claim 8 wherein said plastic material of said boot bearing is polyoxymethylene.

12. A method of making a joint, comprising the steps of:
inserting a portion of a stud into an open bore of a housing such that the stud extends along a central axis out of the inner bore through an open end of the housing;
preparing an elastic boot body that extends from a first boot end to a second boot end;
fixedly attaching a boot bearing that is made of a more rigid material than the elastic boot body with the second boot end of the elastic boot body and wherein the boot bearing has a plurality of radially inwardly extending and annularly shaped first ribs that are separated from one another by at least one first groove;
establishing a static seal between the first boot end of the elastic boot body and the housing; and
establishing a dynamic seal between the first ribs of the boot bearing and the stud and establishing a dynamic seal between a lip formed on the elastic boot body and the stud by way of direct contact between the lip and the stud.

13. The method as set forth in claim 12 wherein the boot bearing further includes a plurality of axially extending and annularly shaped second ribs that are spaced radially from one another by at least one second groove.

14. The method as set forth in claim 12 wherein the boot bearing is made as a single, monolithic piece of polyoxymethylene.

15. The method as set forth in claim 12 further including the step of overmolding the elastic boot body into connection with the boot bearing.

16. The method as set forth in claim 12 wherein the boot bearing presents a pair of flanges which are spaced apart from one another on opposite sides of a channel and wherein the second end of the elastic boot body contacts the boot bearing in the channel and presents a plurality of ridges for reducing a surface-to-surface contact area between the elastic boot body and the boot bearing.

* * * * *